US006014813A

United States Patent [19]

Merino

[11] Patent Number: 6,014,813

[45] Date of Patent: Jan. 18, 2000

[54] POWER HAND SAW WITH POWERED BLADE GUARD ASSEMBLY

[76] Inventor: Frank J. Merino, 1468 Wood St., Crete, Ill. 60417

[21] Appl. No.: 08/953,141

[22] Filed: Oct. 17, 1997

[51] Int. Cl.[7] .......................... B27G 19/04; B23D 45/16; B27B 9/00

[52] U.S. Cl. .......................... 30/391; 83/478; 83/522.12; 83/546

[58] Field of Search ........................ 30/390, 391; 83/397, 83/478, 522.11, 522.12, 546

[56] References Cited

U.S. PATENT DOCUMENTS

| | | | |
|---|---|---|---|
| 3,922,785 | 12/1975 | Fushiya | 30/391 |
| 4,236,343 | 12/1980 | Wildman | 46/39 |
| 4,592,144 | 6/1986 | Tolbert et al. | 30/394 |
| 5,129,300 | 7/1992 | Kawakami | 30/391 X |
| 5,579,584 | 12/1996 | Hoffman | 30/391 |
| 5,699,705 | 12/1997 | Sibbet | 30/391 X |
| 5,782,001 | 7/1998 | Gray | 30/391 |

*Primary Examiner*—M. Rachuba
*Assistant Examiner*—T. Anthony Vaughn
*Attorney, Agent, or Firm*—Wildman, Harrold, Allen & Dixon; Thomas J. Ring

[57] ABSTRACT

A power rotary hand saw (10) with a blade guard 36 mounted for powered movement between a guarding position (FIG. 1) and a nonguarding position (FIG. 2) is moved to the guarding position (FIG. 1) by a separate dedicated electrical motor (46) rotating a drive gear (42) linked with an elongate set of gear teeth (40) and returned when electrical power to the guard drive motor (46) is reversed by a guard control switch (49) separate and apart from a blade drive motor control trigger switch (34). Alternatively, power to the guard drive motor (46) is removed and a coil bias spring (52) return the guard (36) to the guarding position (FIG. 1). The guard driving mechanism (42, 44, 46) is mounted for movement between a drive position (FIG. 1) in which the drive mechanism is linked to the set of gear teeth (40) and a nondrive position in which the drive gear (42) is spaced from linkage with the set of gear teeth (40) and is disabled from responding to actuation of the guard drive power control switch (49).

20 Claims, 4 Drawing Sheets

POWER HAND SAW WITH POWERED BLADE GUARD ASSEMBLY

BACKGROUND OF THE INVENTION

1. Field of the Invention

This invention relates generally to a power hand saw with a movably mounted blade guard and, more particularly, to such a power hand saw in which movement of the blade guard is powered.

2. Description of the Related Art Including Information Disclosed Under 37 C.F.R. 1.97–1.99:

Power hand saws of the type having a circular rotary blade driven by an electrical motor or other source of drive power and having a retractable blade guard are well known. The blade guard is mounted for movement between a guarding position and a nonguarding position. When in the guarding position, the blade is located in a protective relationship with respect to a preselected portion of the circular blade. A coil bias spring resiliently holds the blade guard in the guarding position. Generally, when the foot, or table, of the saw is slid along the work piece, the work piece engages the guard to move it against the force of the bias spring toward a nonguarding position to enable cutting engagement of the blade with the work piece. When the saw is disengaged from the work piece, the bias spring returns the guard to the guarding position.

A problem is encountered when attempting to make a cut adjacent an end of the work piece at which the blade guard is not engageable by the work piece to move it to the nonguarding position. In other instances, without retracting the guard, the blade will cut into the work piece, but the relatively thin portion being cut from the end becomes trapped between the blade and the guard and jams or blocks further movement. In the past, this problem has been addressed in a number of different ways.

In some saws, a handle is mounted to the guide to enable manual movement of the guard to the nonguarding position but this is awkward and difficult, particularly if the user is in a position such as the edge of a roof, cutting rafters. Moreover, such handle disadvantageously locates the user's hand dangerously near the blade. Overcoming this disadvantage are a number of power saws in which the guide is moved to a nonguarding position by powered means.

In U.S. Pat. No. 2,722,246 issued Nov. 1, 1955 to Arnoldy for "Safety Guards for Power Saws", a solenoid partially retracts the guard in response to actuation of a blade drive switch also used to energize the blade drive motor. Accordingly, selective nonretraction of the guard during energization of the blade drive motor is not possible.

Likewise, in U.S. Pat. No. 3,613,748 issued Oct. 19, 1969 to DePue for "Safety Guard Arrangement for Circular Saw", a solenoid is actuated each time power is applied to the blade drive motor and thus retracts the guard during each and every operation of the saw.

In U.S. Pat. No. 3,063,481 issued Nov. 13, 1962 to Sutherland for "Power Saw Guard Retractor", a rubber friction drive wheel is manually moved into engagement with the guard to selective cause it to retract when power is applied to the saw blade. Disadvantageously, in addition to being an awkward means of control, this powered drive guard is capable of only raising the guard after the blade is actively being driven. In addition, the drive requires use of a rubber friction drive roller which is subject to slippage and chemical deterioration from oil on the blade as well as to relative rapid mechanical wear.

SUMMARY OF THE INVENTION

It is therefore the principal object of the present invention to provide a power hand saw which overcomes the disadvantages of known power hand saws with powered blade guards.

The object of the invention is obtained by providing a power hand saw having a housing assembly, a blade movably mounted to the housing assembly and a blade drive power source mounted to the housing assembly and mechanically linked to the blade to selectively provide drive power to the blade in response to a blade drive power source actuator, an elongate blade guard and means for mounting the blade guard to the housing assembly for movement between a guarding position in which a selected portion of the blade is protectively covered by the elongate blade guard and a nonguarding position in which the selected portion of the blade is not protectively covered, with a powered blade guard assembly having a set of gear teeth attached to and extending along the elongate blade guard, a source of blade guard drive power and means for selectively applying drive power through the source of blade guard drive power to the set of gear teeth to selectively move the blade guard from the guarding position to the nonguarding position.

Preferably, the source of blade guard drive power includes an electrical motor with a rotary drive shaft and a drive gear attached to the drive shaft of the motor and linked with the set of gear teeth. The drive power selectively applying means includes a blade guard control switch separate and apart from the blade drive power source actuator and a drive gear in mechanical relationship with the set of gear teeth. The set of gear teeth has a limit gap at a preselected location along the blade guard associated with the nonguarding position at which there are no gear teeth sufficient to enable the drive gear to continue to drive the blade guard away from the guarding position. Preferably, rotatable engagement of the drive gear with a gear tooth adjacent the limit gap during power rotation of the drive gear produces an audible limit indicator indicating that the guard has been fully retracted to the nonguarding position.

Also, the object of the invention is achieved by providing a power hand saw having a housing assembly, a blade movably mounted to the housing assembly and a blade drive power source mounted to the housing assembly and mechanically linked to the blade to provide drive power to the blade, an elongate blade guard and means for mounting the blade guard to the housing assembly for movement between a guarding position in which a selected portion of the blade is protectively covered by the blade and a nonguarding position in which the selected portion of the blade is not protectively covered, with a blade guard assembly having a blade guard drive mechanism, means for mounting the blade guard drive mechanism for movement between a drive position in which the blade guard drive mechanism is linked with the blade guard to enable movement of the blade guard in response to application of power to the blade guard drive mechanism and a nondrive position in which the blade guard drive mechanism is not linked with the blade guard to disable movement of the blade guard in response to application of power to the blade guard drive mechanism and means for selectively applying power to the blade guard drive mechanism.

Preferably, the blade guard drive mechanism includes an electrical motor with a rotatable drive shaft and the power rotating drive member is mounted directly to the drive shaft for rotation with the drive shaft and the mounting means includes means for mounting the drive motor for movement between the guarding position and the nonguarding position to move the rotatable drive member into and out of engagement with the blade guard. The mounting means mounts the blade guard drive mechanism for pivotal movement between the drive position and the nondrive position.

Moreover, the object of the invention is obtained by providing a power hand saw having a housing assembly, a blade movably mounted to the housing assembly and a blade drive power source mounted to the housing assembly and mechanically linked to the blade to provide drive power to the blade, an elongate blade guard and means for mounting the blade guard to the housing assembly for movement between a guarding position in which a selected portion of the blade is protectively covered by the blade and a nonguarding position in which the selected portion of the blade is not protectively covered, with a power blade guard assembly having an electrical blade guard drive motor linked to the blade guard, an electrical switch for selectively applying electrical power to the blade guard drive motor to move the blade guard from the guarding position to the nonguarding position and a spring attached to the blade guard of sufficient strength to return the blade guard from the nonguarding position to the guarding position while the blade guard remains linked to the blade guard rotary drive motor when electrical power to the blade guard drive motor is removed. The blade guard drive motor is driven by the spring to rotate in a reverse direction during movement of the blade guard from the nonguarding position to the guarding position. Alternatively, the blade guard drive motor is a reversible motor which resists movement by the spring when not being powered.

Further, obtainment of the object of the invention is achieved by providing a power hand saw having a housing assembly, a blade movably mounted to the housing assembly and a blade drive power source mounted to the housing assembly and mechanically linked to the blade to provide drive power to the blade in response to a blade drive power source actuator, an elongate blade guard and means for mounting the blade guard to the housing assembly for movement between a guarding position in which a selected portion of the blade is protectively covered by the blade and a nonguarding position in which the selected portion of the blade is not protectively covered, with a blade guard assembly having a blade guard drive mechanism linkable to the blade guard to move the blade guard between the guarding position and the nonguarding position, an independent source of blade guard drive power separate and apart from the blade drive power source for independently applying drive power to the blade guard drive mechanism and a blade guard control switch separate and apart from the blade drive power source actuator for applying electrical power to the blade guard drive mechanism. In one embodiment with a reversible motor, the guard control switch is a two way switch to selectively control movement of the guard in opposite directions between the guarding and nonguarding position.

Preferably, the power hand saw includes a handle with an underside and an upper side, means for mounting the blade drive power source actuator to the handle adjacent the underside of the handle and means for mounting the blade guard control switch to the handle adjacent the upper side but within a sufficiently small distance to enable a person's hand to simultaneously hold both the actuator and the switch in actuated states.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 4:
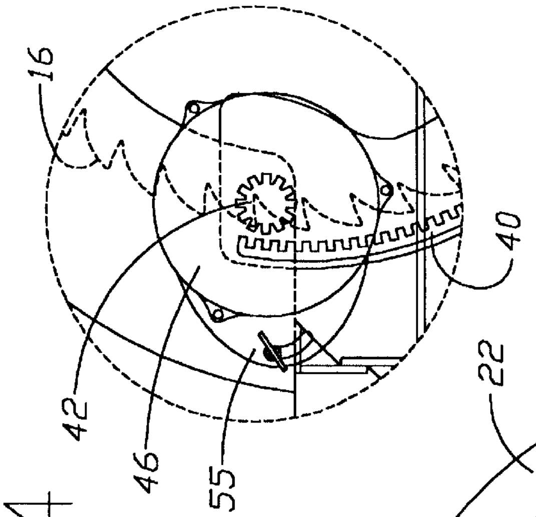
FIG. 4 is another right hand side view of a portion of the power hand saw shown within a broken line circle in FIG. 1 illustrating the guard drive mechanism after being moved to a nondrive position.

Referring now to FIGS. 1, 2, 3 and 4, the preferred embodiment of the power hand saw 10 of the present invention is seen to include a slotted table, or foot, 12 with a slot 14 through which extends a circular saw blade 16 mounted for rotation about a blade drive axle 18 that is driven to rotate by a blade drive electrical motor 20, FIG. 4. An upper guard 22 arcuately extends from a front section 24 to a rear section 26 to protectively cover a selected upper portion of the saw blade 16 extending therebetween. The upper guard 22 is mounted to a right hand end of a housing 28 of the blade drive motor 20 and a handle 30 is mounted to the motor housing 28 to the left of the upper guard 22. A power cord 32 is attached to a rearward section of a handle 30 to connect electric power to the blade drive motor through a drive blade power control trigger switch 34, also seen in FIG. 5.

In accordance with the present invention, the power hand saw is provided with a powered blade guard assembly which includes a lower arcuate blade guard 36 that is mounted for rotary movement about a pivot point axle coincident with the blade drive axle 18 by means of a radial arm 38 which extends between an outer periphery of the lower arcuate blade guard 36 and the blade drive axle 18. The movable mounting of the lower guard 36 enables rotational movement between a guarding position in which a selected portion of the blade 16 is protectively covered by the elongate lower blade guard 36, as shown in FIG. 1, and a nonguarding position, as shown in FIG. 2, in which the selected position of the blade 16 is not protectively covered.

In accordance with one aspect of the present invention, fixedly attached to an outer right side of the lower blade guard 36 is a set of gear teeth 40 arcuately extending along the outer perimeter of the lower blade guard 36 which is engageable by a drive gear 42 attached to a drive shaft 44 connected to a source of rotary power. The source of rotary power for the guard drive shaft 44 is preferably an electrical guard drive motor 46 which is separate and apart from the blade drive motor 20 and is controlled separately from control of the blade drive motor 20 through action of trigger switch 34.

A separate blade guard switch 49 is used to apply electrical power from power cord 32 to the guard drive motor 46 to apply drive power therethrough to the set of gear teeth 40 to selectively move the blade guard 36.

Figure 1:
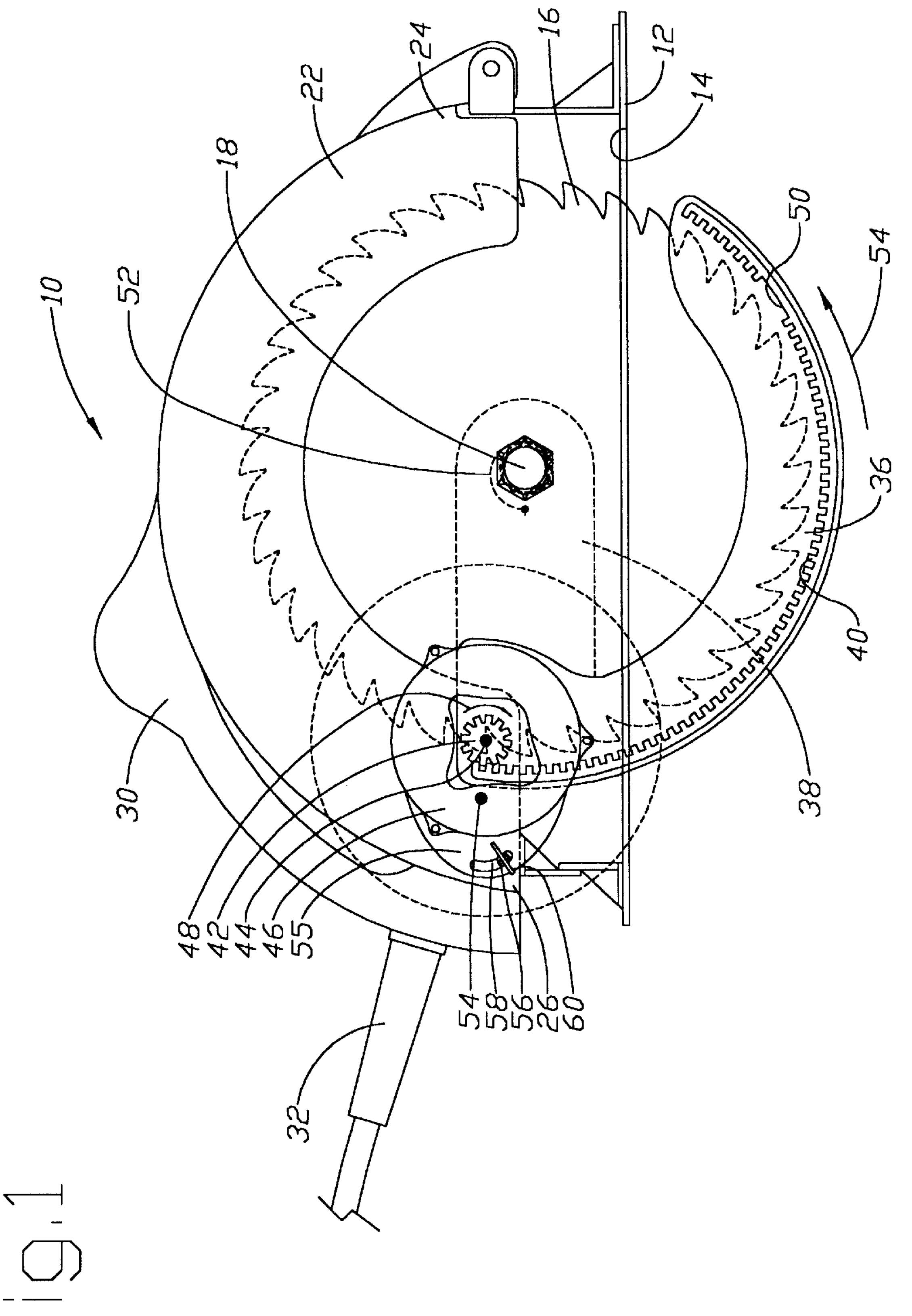
FIG. 1 is a right side elevational view of the preferred embodiment of the power hand saw of the present invention in which a blade guard drive mechanism is mounted in a drive position and the blade guard is in a guarding position.
Figure 2:
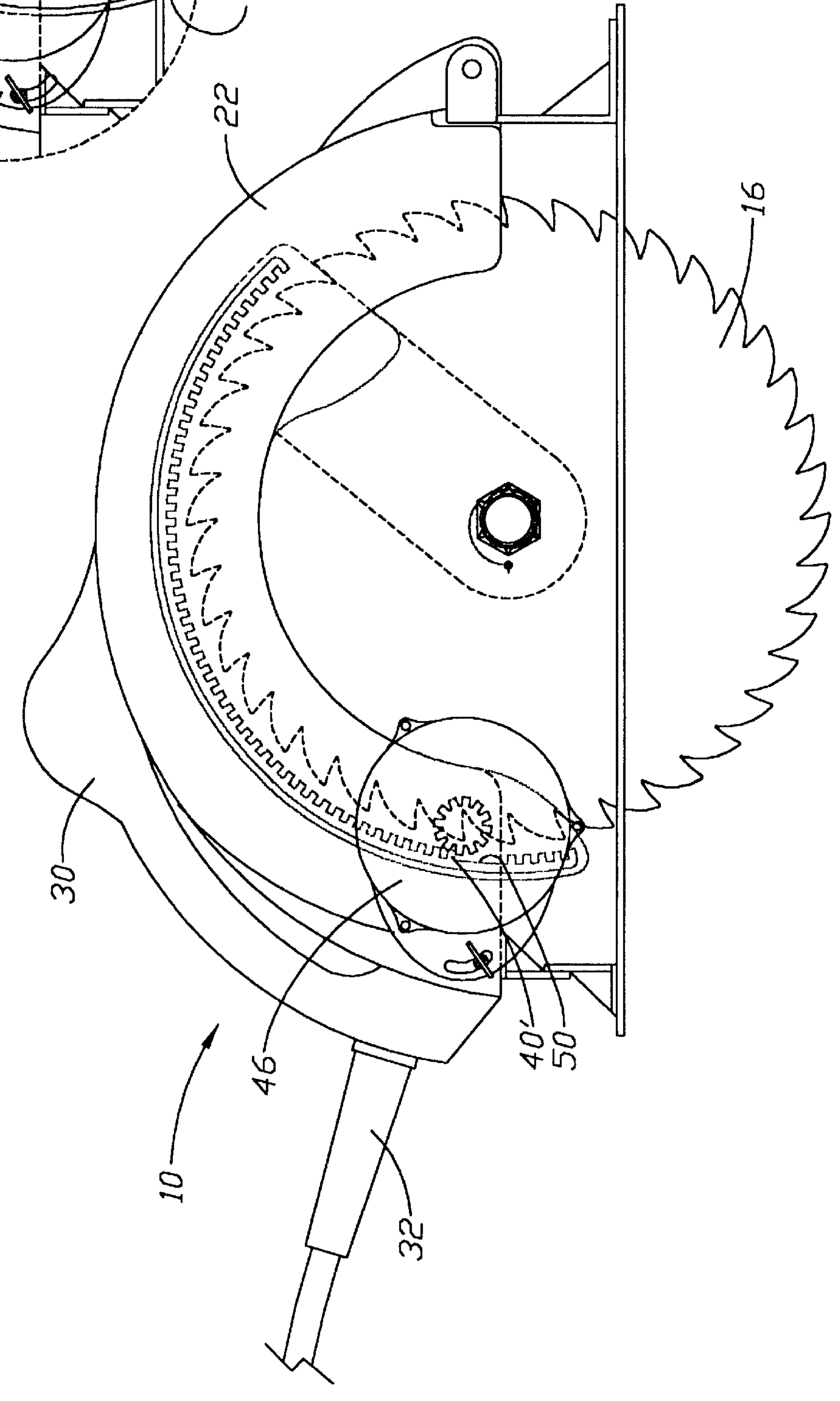
FIG. 2 is another right side elevation view of the power hand saw of FIG. 1 but in which the blade guard has been driven to a preselected nonguarding position.

If electrical power is selectively applied to the electrical motor 46 when the drive gear 42 is mechanically engaged with the set of gear teeth 40, as shown in FIG. 1, the drive gear 42 rotates in a clockwise direction as indicated by arrow 48 to power drive the lower guard from the guarding position of FIG. 1 to the nonguarding position shown in FIG. 2.

The guard drive motor 46 is preferably a 110/115 VAC, amp motor with an output torque sufficient to overcome the bias spring. When electrical power is applied to the motor, it rotates in the direction of arrow 48 at approximately forty revolutions per minutes to retract the guard to the nonguarding position in approximately ten to twenty seconds.

The set of gear teeth 40 has a limit gap 50 at a preselected location along the blade guard 36 associated with the nonguarding position. At this limit gap 50, there are no gear teeth sufficient to enable the drive gear 42 to continue to drive the blade guard 36 in a clockwise direction away from the guarding position. Accordingly, when the limit gap 50 reaches the location of the drive gear 42, the drive gear 42 is unable to continue to drive the blade guard 36 any further. Advantageously, when the limit gap 50 is reached, continued rotatable engagement of the drive gear with a gear tooth 40' adjacent the limit gap produces an audible limit indicator indicating that the guard 36 has been fully retracted to the nonguarding position as shown in FIG. 2.

Figure 5:
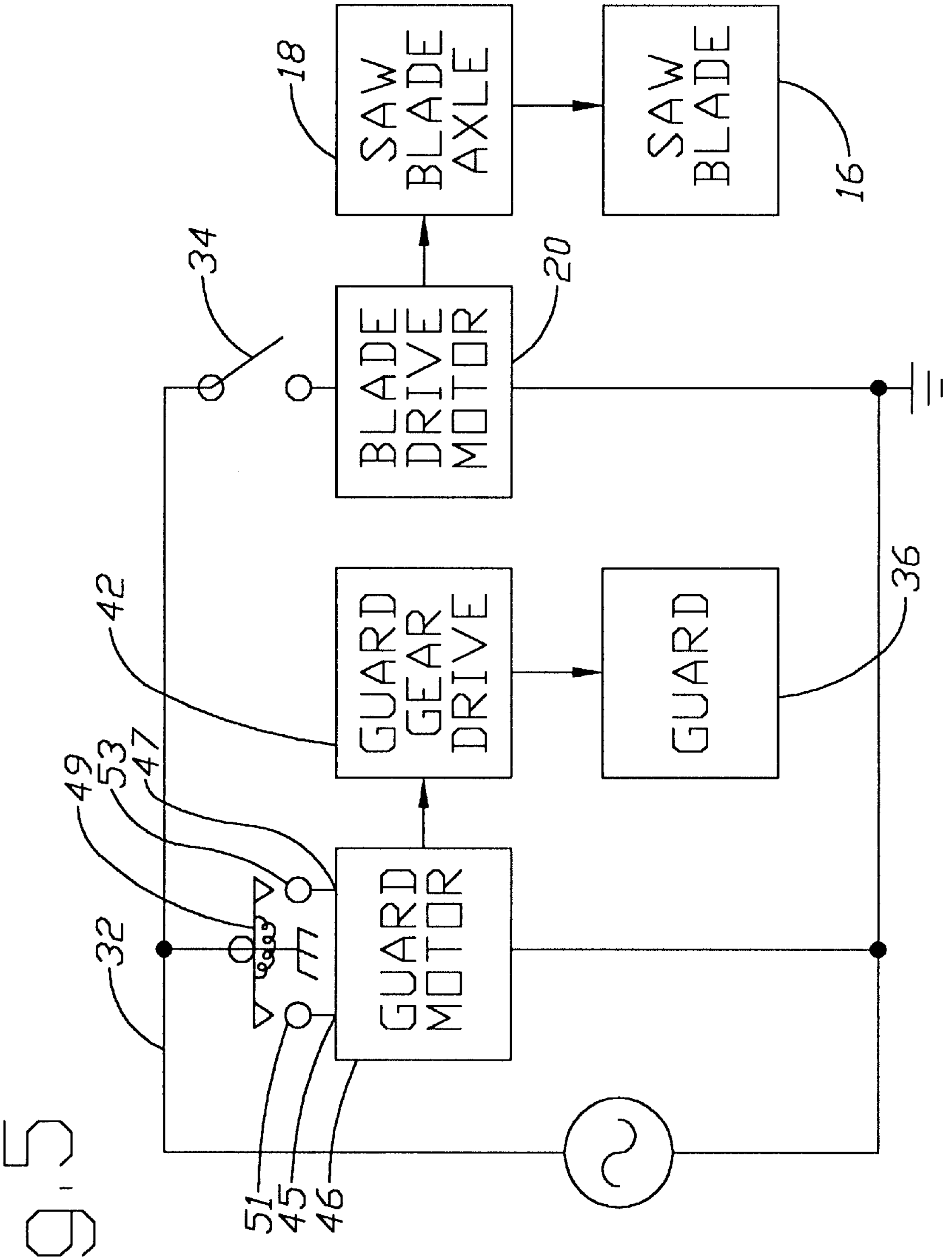
FIG. 5 is a functional block diagram of the control circuit for the power hand saw of FIGS. 1–4.

Two embodiments are contemplated which are different with respect to the manner in which the guard 36 is returned to the guarding position shown in FIG. 1. Referring to FIG. 5, in the preferred embodiment, the guard motor 46 is a reversible electrical motor with two power terminals 45 and 47, respectively associated with two opposite directions of rotation which are connected to a pair of switch terminals 51 and 53, respectively, of a two pole, rocker arm switch 49. A spring 54 biases the switch in a neutral position as shown in FIG. 5 in which electrical power is not applied to either one of terminals 45 and 47. In this embodiment, a coil spring 52 is selected which is of insufficient strength to rotate the drive gear 42 and motor drive shaft 44 of motor 46 to rotate in a counterclockwise direction, or reverse direction, opposite to the direction of arrow 48 which the drive gear remains engaged, or linked, with the set of gear teeth 40. The guard 36 is moved to the nonguarding position which the switch 49 is switched into contact with terminal 53 to rotate the motor 46 in a reverse direction. The guard is moved to the guarding position when the switch 49 is held into contact with switch terminal 51 to rotate the motor 46 in the forward direction. When the switch 49 is manually released and not held in contact with either of the terminals 51 and 53, the friction of the drive gear 42 engaged with the set of gear teeth 40 and of the motor holds the guard against movement in whatever positions it is in when electrical power is removed from the guard motor 46 by the coil spring 52.

Alternatively, in a preferred embodiment which does not require the power of a reversing motor and two position switch results in automatic return of the guard 40 to the guarding position by the coil bias spring 52.

In such case, the blade guard 36 is held in the nonguarding position as long as drive power continues to be applied to drive gear 42. Preferably, the bias coil spring 52 has sufficient strength to move the blade guard 36 to rotate from the nonguarding position shown in FIG. 2 to the guarding position shown in FIG. 1 in the counter clockwise direction of arrow 54 even when the drive wheel is engaged when power is removed. However, so long as electrical power is applied to the guard drive motor 42, rotatable engagement of the drive gear 42 with gear teeth 40', FIG. 2, located adjacent the limit gap 50 holds the blade guard 36 in the nonguarding position against return to the guarding position by the bias spring 52.

In the alternative embodiment, when it is desired to return the blade guard 36 to the guarding position, the blade guard control switch 49 is opened to remove electrical power from the blade guard drive motor 46 and allow the bias spring 52 to return the blade guard 36 to the guarding position. The drive gear 42 remains engaged, or linked, with the set of gear teeth 40, and the set of gear teeth 40 driven by the bias spring 52 rotates the drive gear 42 and motor drive shaft 44 of motor 46 to rotate in a counter clockwise direction, or reverse direction, opposite to the direction of arrow 48 until the end of the set of gear teeth is reached as shown in FIG. 1. The strength of the bias spring 52 is thus selected to overcome rotor and drive gear friction when the motor 46 is not energized.

Advantageously, in both embodiments the positive gear drive provided by the guard drive gear 42 and set of gear teeth 40 eliminates slippage or rapid wear or other deterioration resulting from oil or the like on the rotary blade.

In accordance with another aspect of the invention, the blade guard drive mechanism formed by the blade guard drive motor 46, the drive shaft 44 and the drive gear 42 are mounted for movement between a drive position and a nondrive position. Referring to FIGS. 1 and 2, in the drive position, the drive gear 42 is linked with the blade guard 36 by meshing with the set of gear teeth 40 to enable movement of the blade guard 36 in response to application of power to the blade guard drive motor 46. When in the nondrive position, as shown in FIG. 3, the blade guard drive gear 42 is spaced from and not linked with the blade guard 36.

Thus, when in the nondrive position, the blade guard drive mechanism is disabled from moving the blade guard 36 in response to application of electrical power to the guard drive motor 46 through actuation of blade guard control switch 49. In such case, the coil bias spring 52 need not work against the idle motor 46 and drive gear 42 to return the guard 36 to the guarding position. Also, when disabled in this fashion, the guard will not be undesirably moved to a nonguarding position in the case of inadvertent actuation of the guard control switch 49. The ability to disable the guard drive mechanism from responding to actuation of the guard control switch advantageously prevents inadvertent movement of the guard to the nonguarding position because of accidental actuation of the guard control switch.

Figure 3:
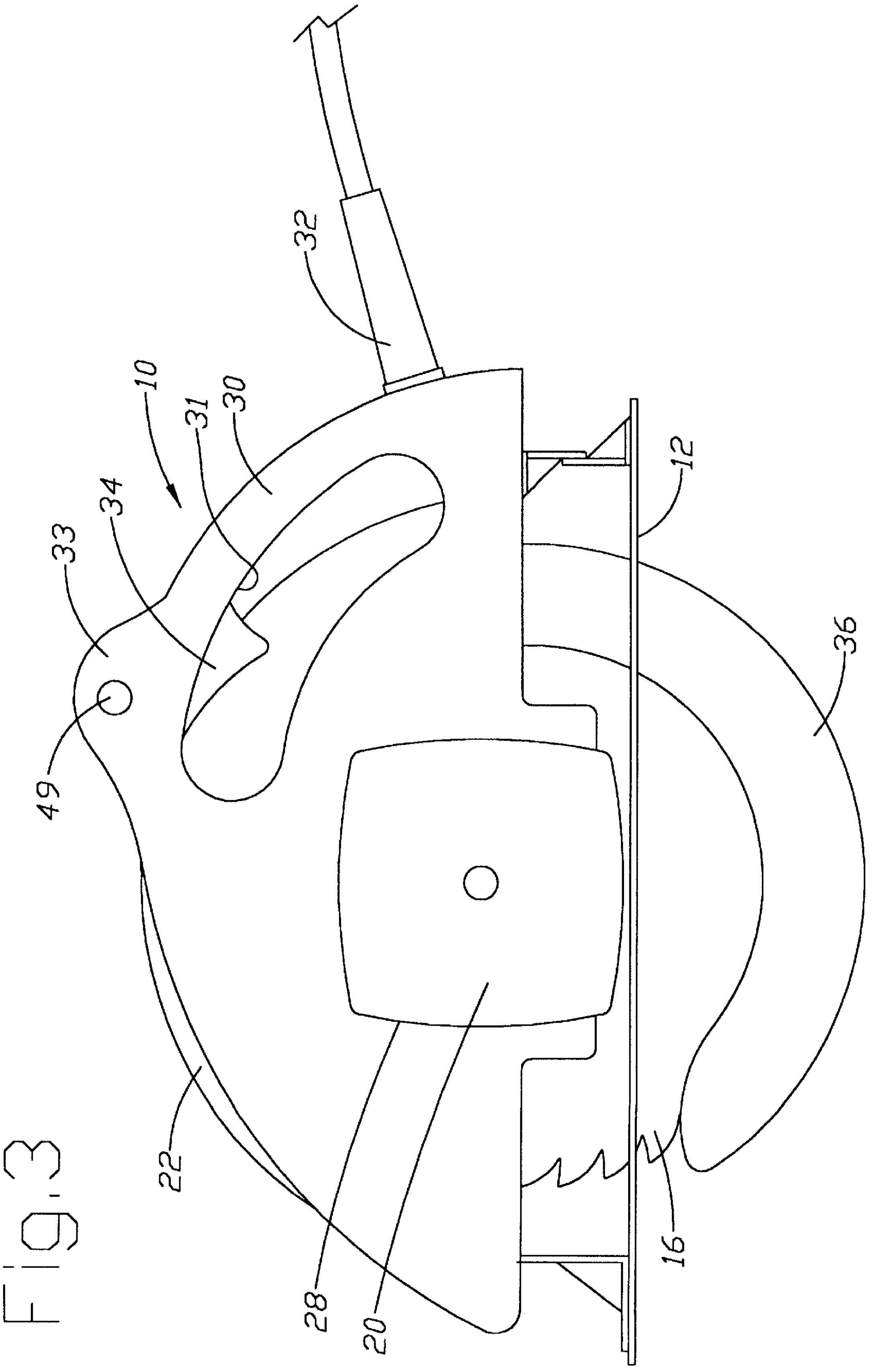
FIG. 3 is a left hand side elevational view of the power hand saw of FIG. 1 showing the location of the blade trigger control switch and the guard control switch.

Preferably, as seen in FIG. 1, the guard drive motor 46 is mounted to a base plate 55 which, in turn, is mounted to the outer side of the upper guard 22 for pivotal movement about a pivot axle 54 between the drive position of FIGS. 1 and 2 and the nondrive position of FIG. 3. A threaded stud 56 attached to the upper guard 22 extends through an arcuate slot 58 for engagement with a wing nut 60 or other fastener for releasably selectively locking the blade guard drive mechanism in said drive position and nondrive position. The stud 56 and slot 58 also provide lateral support for more securely holding the plate 52 and motor 46 to the upper guard 22.

Preferably, the blade guard control switch 49 is biased to move to a normally open position in which electrical power is removed from the electrical motor 46. Accordingly, the switch 49 must be manually held in the closed position to keep the guard 36 in the nonguarding position. The blade drive power trigger switch 34 is mounted to the handle 30 adjacent an underside 31 of the handle 30 while the blade guard control switch 49 is also mounted to a upper side 33 of the handle 30 spaced from the trigger switch 34. While spaced from the trigger switch 34, the distance of the spacing is sufficiently small a distance to enable a person's hand to simultaneously hold both the trigger switch 34 and the guard control switch 49 in an actuated state with a person's forefinger and thumb, respectively.

As noted above, referring to FIG. 5, the control switch for the guard drive motor is connected to a source of power independently of the blade drive motor control switch. Unlike the prior art, this independent control enables the guard to be retracted selectively before power is applied to the blade if desired while eliminating the need to have blade drive power being applied in order to retract or return the guard. In the one embodiment, in the event of electrical failure or removal, the bias spring 52 automatically returns the guard to the protective guarding position; likewise, removal of manual pressure on the guard control switch 49 will advantageously result in return of the guard to the protective guarding position. In the other embodiment, the double pole switch has to be held in the reversing position to return the guard to the guarding position, but this is capable of being done before power to the blade drive motor is applied.

While a detailed description of the preferred embodiment of the invention has been given, it should be appreciated that many variations can be made thereto without departing from the scope of the invention as set forth in the appended claim.

I claim:

1. In a power hand saw having a housing assembly, a blade movably mounted to the housing assembly and a blade drive power source mounted to the housing assembly and mechanically linked to the blade to selectively provide drive power to the blade in response to a blade drive power source actuator, an elongate blade guard and means for mounting the blade guard to the housing assembly for movement between a guarding position in which a selected portion of the blade is protectively covered by the elongate blade guard and a nonguarding position in which the selected portion of the blade is not protectively covered, the improvement being a power blade guard assembly, comprising:

a set of gear teeth fixedly attached to and extending along the elongate blade guard;

a source of blade guard drive power; and means for selectively applying drive power through the source of blade guard drive power to the set of gear teeth to selectively move the blade guard from the guarding position to the nonguarding position and move the blade guard from the nonguarding position to the guarding position.

2. The power hand saw of claim 1 in which said source of blade guard drive power includes an electrical motor with a rotary drive shaft, and a drive gear attached to the drive shaft of the motor and linked with the set of gear teeth, and said selectively applying means includes a blade guard control switch separate and apart from the blade drive power source actuator.

3. The power hand saw of claim 1 in which said selectively applying means includes a drive gear in mechanical relationship with the set of gear teeth, and said set of gear teeth has a limit gap at a preselected location along the blade guard associated with the nonguarding position at which there are no gear teeth sufficient to enable the drive gear to continue to drive the blade guard away from the guarding position.

4. The power hand saw of claim 3 including a spring for biasing the blade guard to move from the nonguarding position to the guarding position, and in which rotatable engagement of the drive gear with a gear tooth adjacent the limit gap during power rotation of the drive gear produces an audible limit indicator indicating that the guard has been fully retracted to the nonguarding position.

5. In a power hand saw having a housing assembly, a blade movably mounted to the housing assembly and a blade drive power source mounted to the housing assembly and mechanically linked to the blade to provide drive power to the blade, an elongate blade guard and means for mounting the blade guard to the housing assembly for movement between a guarding position in which a selected portion of the blade is protectively covered by the blade and a nonguarding position in which the selected portion of the blade is not protectively covered, the improvement being a powered blade guard assembly, comprising:

a blade guard drive mechanism including a power rotatable drive member and an electrical drive motor with a rotatable drive shaft and in which the power rotatable drive member is mounted directly to the drive shaft for rotation with the drive shaft;

means for mounting the blade guard drive mechanism for movement between a drive position in which the blade guard drive mechanism is linked with the blade guard in which the rotatable drive member is in engagement with a set of gear teeth fixedly attached to and extending along the blade guard to enable movement of the blade guard between the guarding and nonguarding position in response to application of power to the blade guard drive mechanism, and a nondrive position in which the blade guard drive mechanism is not linked with the blade guard in which the rotatable drive member is out of engagement with the set of gear teeth fixedly attached to and extending along the blade guard to disable movement of the blade guard in response to application of power to the blade guard drive mechanism; and means for selectively applying power to the blade guard drive mechanism to selectively move the blade guard between opposing positions of the guarding position and the nonguarding position.

6. The power hand saw of claim 5 in which said mounting means includes means for mounting the power rotatable drive member for movement between the drive position in which the rotatable drive member is engaged with the blade guard, and the nondrive position in which the power rotatable drive member is disengaged from the blade guard.

7. The power hand saw of claim 5 in which said mounting means mounts the blade guard drive mechanism for pivotal movement between the drive position and the nondrive position.

8. The power hand saw of claim 5 including means for selectively locking the blade guard drive mechanism in at least one of said drive position and said nondrive position.

9. In a power hand saw having a housing assembly, a blade movably mounted to the housing assembly and a blade drive power source mounted to the housing assembly and mechanically linked to the blade to provide drive power to the blade, an elongate blade guard and means for mounting the blade guard to the housing assembly for movement between a guarding position in which a selected portion of the blade is protectively covered by the blade guard and a nonguarding position in which the selected portion of the blade is not protectively covered, the improvement being a power blade guard assembly, comprising:

an electrical blade guard drive motor linked to the blade guard;

an electrical switch for selectively applying electrical power to the blade guard drive motor to move the blade guard from the guarding position to the nonguarding position; and a spring attached to the blade guard of sufficient strength to return the blade guard from the nonguarding position to the guarding position while the blade guard remains linked to the blade guard drive motor when electrical power to the blade guard drive motor is removed, said blade guard drive motor being driven by the spring to rotate in a reverse direction during movement of the blade guard from the nonguarding position to the guarding position.

10. The power hand saw of claim 9, including a set of gear teeth attached to the blade guard, and a driving gear for linking the electrical blade guide drive motor to the set of gear teeth and in which the engagement of the gear teeth with the driving gear rotates the driving gear when the blade guard is moved to the guarding position by the spring.

11. The power hand saw of claim 9 including means for disengaging the electrical blade guard drive motor from linkage with the blade guard to enable movement of the blade guard to the guarding position without causing reverse rotation of the blade guard drive motor.

12. The power hand saw of claim 9 in which the electrical blade drive motor is separate and apart from the blade drive power source, and said electrical switch controls application of power to only the blade guard drive motor.

13. The power hand saw of claim 9 in which the spring is fixedly attached to the blade guard, and the electrical motor has an output torque of sufficient magnitude to overcome the spring.

14. In a power hand saw having a housing assembly, a blade movably mounted to the housing assembly and a blade drive power source mounted to the housing assembly and mechanically linked to the blade to provide drive power to the blade in response to a blade drive power source actuator, an elongate blade guard and means for mounting the blade guard to the housing assembly for movement between a guarding position in which a selected portion of the blade is protectively covered by the blade and a nonguarding position in which the selected portion of the blade is not protectively covered, the improvement being a powered blade guard assembly, comprising:

a blade guard drive mechanism having a drive member in engagement with a set of gear teeth fixedly attached to and extending along the blade guard to move the blade guard between the guarding position and the nonguarding position;

an independent source of blade guard drive power separate and apart from the blade drive power source for independently applying drive power to the blade guard drive mechanism including a reversible electrical rotary motor for rotating the drive member in opposite directions and directly moving the blade guard in opposite directions between a guarding position and nonguarding position; and a blade guard control switch separate and apart from the blade drive power source actuator for applying electrical power to the blade guard drive mechanism.

15. The power hand saw of claim 14 in which said blade guard control switch includes means for biasing the switch to a switch position in which electrical power is not applied to the blade guard drive mechanism.

16. The power hand saw of claim 14 including means for disabling the blade guard drive mechanism from moving the blade guard in response to actuation of the blade guard control switch.

17. The power hand saw of claim 16 in which said disabling means includes means for disengaging the blade guard drive mechanism from the blade guard.

18. The power hand saw of claim 14 including a handle with an underside and an upper side, means for mounting the blade drive power source actuator to the handle adjacent the underside of the handle, and means for mounting the blade guard control switch to the handle adjacent the upper side but within a sufficiently small distance to enable a person's hand to simultaneously hold both the actuator and the switch in actuated states.

19. The power hand saw of claim 14 in which said blade guard control switch is a double pole switch with two switch positions to selectively apply electrical power to the blade guard mechanism to drive the blade guard drive mechanism in two opposite directions.

20. The power hand saw of claim 15 including means for providing an audible indication when the blade guard has reached the nonguarding position.

* * * * *